United States Patent [19]

Norell

[11] Patent Number: 5,002,746

[45] Date of Patent: Mar. 26, 1991

[54] PROCESS FOR PRODUCTION OF CHLORINE DIOXIDE

[75] Inventor: Maria Norell, Sundsvall, Sweden

[73] Assignee: Eka Nobel AB, Surte, Sweden

[21] Appl. No.: 372,469

[22] Filed: Jun. 28, 1989

Related U.S. Application Data

[63] Continuation-in-part of Ser. No. 309,232, Feb. 13, 1989, abandoned.

[30] Foreign Application Priority Data

Oct. 20, 1988 [SE] Sweden .............................. 8803761

[51] Int. Cl.$^5$ .............................................. C01B 11/02
[52] U.S. Cl. ................................................. 423/479
[58] Field of Search ................................ 423/478, 479

[56] References Cited

U.S. PATENT DOCUMENTS

| | | | |
|---|---|---|---|
| 3,563,702 | 2/1971 | Partridge et al. | 423/478 |
| 3,864,456 | 2/1975 | Winfield et al. | 423/478 |
| 3,933,988 | 1/1976 | Rosen | 423/480 |
| 4,051,229 | 9/1977 | Isa et al. | 423/478 |
| 4,081,520 | 3/1978 | Swindells et al. | 423/478 |
| 4,145,401 | 3/1979 | Swindells et al. | 423/478 |
| 4,154,809 | 5/1979 | Swindells et al. | 423/479 |
| 4,154,810 | 5/1979 | Isa et al. | 423/478 |
| 4,169,134 | 9/1979 | Isa et al. | 423/478 |
| 4,178,356 | 12/1979 | Shibuya et al. | 423/478 |
| 4,381,290 | 4/1983 | Hardee et al. | 423/478 |
| 4,465,658 | 8/1984 | Fredette | 423/478 |
| 4,473,540 | 9/1984 | Fredette | 423/479 |
| 4,770,868 | 9/1988 | Norell | 423/479 |

FOREIGN PATENT DOCUMENTS

| | | |
|---|---|---|
| 0065819 | 12/1982 | European Pat. Off. . |
| 0131378 | 1/1985 | European Pat. Off. . |
| 0284577 | 9/1988 | European Pat. Off. . |
| 2426016 | of 1979 | France . |
| 2464224 | of 1981 | France . |
| 328854 | 9/1970 | Sweden . |

*Primary Examiner*—Michael L. Lewis
*Assistant Examiner*—Brian M. Bolam
*Attorney, Agent, or Firm*—Burns, Doane, Swecker & Mathis

[57] ABSTRACT

The present invention relates to a process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and an acidity within the interval from a b out 2 to 4.8 N and subjected to a subatmospheric pressure sufficient to effect evaporation if water. A mixture of chlorine dioxide and water vapor is withdrawn from an evaporation region in the reaction vessel and an alkali metal salt of the mineral acid is precipitated in a crystallization region in the reaction vessel. The reaction is performed in the presence of a catalyst, which comprises a metal or a combination of two or more metals being selected from the group consisting of antimony, molybdenum, technetium, ruthenium, rhodium, palladium, rhenium, osmium, iridium, platina, or a combination of one or more of these with manganese or vanadium.

9 Claims, No Drawings

PROCESS FOR PRODUCTION OF CHLORINE DIOXIDE

Cross-reference to related application.

This application is a continuation-in-part of application Ser. No. 07/309,232, filed Feb. 13, 1989, now abandoned.

The present invention relates to a process for production of chlorine dioxide from an alkali metal chlorate, a mineral acid and methanol as a reducing agent. The process is carried out at low acidities. According to the invention the reaction conditions are improved by the use of certain metal catalysts. The process is carried out in a vessel operated under subatmospheric pressure, whereby water is evaporated and withdrawn together with chlorine dioxide and the alkali metal salt of the mineral acid is crystallized within the reaction vessel and withdrawn therefrom.

Chlorine dioxide used as an aqueous solution is of considerable commercial interest, mainly in pulp bleaching but also in water purification, fat bleaching, removal of phenols from industrial wastes, etc. It is therefore desirable to provide processes by which chlorine dioxide can be efficiently produced.

It is known to produce chlorine dioxide by the reduction of alkali metal chlorate in a water based acidic reaction medium. Different reducing agents can be used. In U.S. Pat. Nos.3,563,702 and 3,864,456 the preparation of chlorine dioxide with chlorine as a reducing agent is described. The predominant chemical reaction involved in such processes is summarized by the formula $$ClO_3^- + Cl^- + 2H^+ \rightarrow ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions by mineral acids, normally sulfuric acid and/or hydrochloric acid. The reactants are continuously added and the reaction is performed in one single reaction vessel, generator - evaporator crystallizers at a temperature from about 50 to about 100° C. and with an acidity from about 2 to about 12N.

In the production of $ClO_2$ using chloride ions as a reducing agent according to formula [1] chlorine gas is formed as a by-product. This chlorine gas by-product has formerly been used as such in the paper mills as a bleaching agent in aqueous solution. Today there is a tendency towards a more extensive chlorine dioxide bleaching for environmental reasons and thus there is a decreasing need for chlorine as a bleaching agent.

It is also known to use reducing agents, which do not produce chlorine. In U.S. Pat. No. 4,770,868 methanol is used as a reducing agent. The reaction proceeds according to the formula $$6NaClO_3 + CH_3OH + 4H_2SO_4 \rightarrow 6ClO_2 + CO_2 + 5H_2O + 2Na_3H(SO_4)_2 \qquad [2]$$

However, the direct reaction between chlorate ions and methanol is very slow and the true reducing agent in this case is chloride ions reacting according to [1]. The chlorine produced is then reacting with methanol to regenerate chloride ions according to the formula $$CH_3OH + 3Cl_2 + H_2O \rightarrow 6Cl^- + CO_2 + 6H^+ \qquad [3]$$

It is therefore often necessary to continuously add a small amount of chloride ions in order to obtain a steady production.

Chlorine dioxide production can be performed within a wide acidity interval, usually 2-11N. From a corrosive point of view it is advantageous to work at a low acidity as corrosion increases with increasing acidity. Another advantage in performing the reaction at a low acidity is that the precipitated alkali metal sulfate is neutral, no acid is coprecipitated, which occurs at a higher acidity. Therefore no extra neutralization step is required for the salt precipitated. A low acidity refers to the interval between about 2 and about 4.8N. However, a disadvantage with chlorine dioxide production within this interval is that the reaction proceeds very slowly. It is known that the reaction speed can be increased when using chloride as a reducing agent by the use of a small amount of catalyst. Proposed catalysts are i.a. vanadium pentoxide, silver ions, manganese ions, dichromate ions and arsenic ions.

In U.S. Pat. No. 4,145,401 a process for increasing the efficiency in chlorine dioxide production with chloride as a reducing agent at a low acidity is described by using small amounts of methanol together with the chloride the yield of chlorine dioxide can be increased. The yield is gradually increasing with an increasing addition of methanol up to 0.1 ton/ton $ClO_2$. Additions of methanol above this level gives a most inefficient chlorine dioxide formation of the same type as in the Solvay process. It is also mentioned that catalysts such as silver and manganese ions can be used but it is not necessary in order to obtain a high efficiency.

The processes using methanol as a reducing agent are usually performed at an acidity above 4.8 in order to obtain an acceptable reaction speed. Even if it is noticed that the above mentioned catalysts for chloride also can be used together with methanol, they do not in practice give a process being efficient enough.

The present invention as it appears from the claims provides an improved process for production of chlorine dioxide with methanol as a reducing agent at an acidity from about 2 to about 4.8N. It has surprisingly appeared that the reaction speed can be considerably increased in chlorine dioxide production at a low acidity with methanol as a reducing agent if the reaction is performed in the presence of a catalyst, which comprises a metal or a combination of two or more metals being selected from the group consisting of antimony, molybdenum, technetium, ruthenium, rhodium, palladium, rhenium, osmium, iridium, platina or a combination of one or more of these with manganese or vanadium. Particularly good results were obtained with the combinations palladium and antimony, palladium and manganese, and palladium and molybdenum. However, silver and/or manganese, which are known catalysts when chloride is used as a reducing agent, did not give any catalytic effect.

It has also surprisingly appeared that when the reaction is performed in the presence of these catalysts it is possible to maintain a high yield even when the temperature in the reactor is increased. Usually the yield decreases with increasing temperature as chlorine dioxide is decomposed at elevated temperatures.

The catalysts according to the invention are used in the form of soluble salts or complexes such as e.g. chlorides and sulfates. They are added in such an amount that the concentration in the reactor solution is 0.001 to 10 mM, preferably 0.01 to 5 mM. The catalysts are added to the reactor as a solution, intermittently if required or continuously with a lower regular flow.

The production of chlorine dioxide according to the present process is performed in one single reaction vessel, generator - evaporator - crystallizer. A suitable reactor is a SVP ® (single vessel process) reactor. The reactants are added continuously to the reactor. The alkali metal chlorate is added in an amount of 1.58 to 2.0 ton/ton chlorine dioxide The reaction is advisably performed at a temperature of 50–100° C., preferably 50–75° C., and a pressure below atmospheric pressure, preferably at 60–400 mm Hg. Then the reaction medium boils or water is evaporated in an amount sufficient to dilute the chlorine dioxide formed to a safe concentration. The acidity in the reactor is maintained between 2 and 4.8N by the addition of sulfuric acid or another mineral acid. In the reactor the alkali metal salt of the mineral acid is continuously crystallized and is separated in an appropriate way. In order to avoid production losses during start and at production changes an addition of a small amount of chloride ions is appropriate, preferably in the form of alkali metal chloride, so as to maintain the concentration thereof in the reactor within the interval from 0.001 and up to 0.8 moles per liter. The process is not limited to any of the alkali metals, but sodium is the most preferred one.

The invention is illustrated by means of the following examples, where parts and percentages mean parts by weight and percentages by weight, unless otherwise is specified.

EXAMPLE 1

To a chlorine dioxide reactor 247 g/h $NaCl_3$, 3 g/h NaCl, 26 g/h methanol and 50% sulfuric acid were added to a normality of 4N. The reactor was working continuously at a subatmospheric pressure, 150 mm Hg absolute, and a temperature of 70° C.

The amount of sodium chlorate in the reactor increased in the course of the experiment from 2.3 to 4.2M, which implied that only 43% of the chlorate added was converted. Thus the reaction speed was very low and the chlorine dioxide production was only 75 g/h. The yield of chlorine dioxide based on the chlorate converted was 90%.

EXAMPLE 2

Reaction conditions in accordance with Example 1 plus additions of $PdCl_2$ and $MnSO_4$ to a concentration of 1 mM each in the reactor solution $PdCl_2$ and $MnSO_4$ were added as once-for-all doses, not continuously.

During this experiment the chlorate concentration was not increased in the reactor solution and the actual $ClO_2$-production during the experiment of the duration of 3 h was 151 g/h with a yield of 96% of reacted $NaClO_3$. This is thus a doubled production in comparison with the production without a catalyst.

EXAMPLE 3

This experiment shows the effect of an increased pressure (increased temperature) on the yield.
353 g/h $NaClO_3$,
4 g/h NaCl,
76 g/h MeOH 50 wt. %, and
50 wt. % $H_2SO_4$ in order to maintain the acidity at 4N were added continuously to a reactor working at a pressure of 90 mm Hg absolute and during boiling at 63° C. $ClO_2$ and $Cl_2$ gas plus solid sodium sulfate salt were continuously removed. At a steady state an average value for % $GA^1$ of 93% was obtained (GA = Gram Atom Percent chlorine dioxide).

In a second experiment, identical with the experiment above except for pressure and temperature, now being 200 mm Hg and 81° C. respectively, an average value for % $GA^1$ of 89% was obtained at a steady state.

$$GA \% Cl_2 = \frac{Cl \text{ in } ClO_2}{Cl \text{ in } ClO_2 + Cl \text{ in } Cl_2} \quad 1$$

EXAMPLE 4

Reaction chemicals were added in accordance with Example 1 to the same reactor working continuously, now at a pressure of 250 mm Hg and a temperature of 83° C. $PdCl_2$ and $MnSO_4$ were present in the reactor solution to a concentration of 1 mM each.

An average value for % GA of 98% was obtained. Solid sodium sulfate was continuously removed.

EXAMPLE 5

In a $ClO_2$-reactor working at the following concentrations

| | |
|---|---|
| $H_2SO_4$ | 2.01 M |
| $NaClO_3$ | 0.80 M |
| NaCl | 0.021 M |
| $CH_3OH$ | 0.183 M | and at 40° C. a chlorine dioxide production of 0.1 g/l,h was obtained. At the addition of a silver and manganese catalyst an unchanged production level of 0.1 g/l,h was obtained (0.8 mM Mn and 0.03 mM Ag). When a palladium and manganese catalyst was added instead of Ag and Mn a strongly increased production of 2.2 and 2.4 g/l,h at 0.08 and 0.8 mM Pd respectively and 0.8 mM Mn was obtained.

Experiments with other catalysts alone and in combination in the same reactor gave results according to the table below:

| Catalyst | Conc. mM | Production of $ClO_2$ g/l,h |
|---|---|---|
| Pd | 0.8 | 0.8 |
| Sb | 0.8 | 1.2 |
| Mo | 0.8 | 1.1 |
| V | 0.8 | 0.4 |
| Ag | 0.02–0.03 | 0.1 |
| Mn | 0.8–4 | 0.1 |
| Cr | 0.8–4 | 0.1 |
| As | 0.08–0.4 | 0.1 |
| Pd + Sb | each as above | 3.0 |
| Pd + Mo | " | 2.0 |
| Pd + Mn | " | 2.3 |
| Pd + V | " | 1.0 |
| Sb + Mo | " | 1.6 |
| Sb + V | " | 1.6 |
| Mo + V | " | 1.5 |
| Without catalyst | — | 0.1 |

I claim:
1. A process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and an acidity within the interval from about 2 to 4.8N and subjected to a subatmospheric pressure sufficient to effect evaporation of water whereby a mixture of chlorine dioxide and water vapor is withdrawn from an evaporation region in the reaction vessel and an alkali metal salt of the mineral acid is precipitated in a crystallization region in the reaction vessel, wherein the reaction is performed in the presence of a catalyst comprising a combination of antimony and molybdenum, antimony and vanadium, or molybdenum and vanadium, said catalyst being added in the form of a solution of soluble salts.

2. A process according to claim 1, wherein the catalyst is added in such an amount that the concentration in the reaction medium is 0.001 to 10 mM.

3. A process according to claim 1, wherein the soluble salt or salts are selected from the group consisting of chlorides, sulfates and combinations thereof.

4. A process for production of chlorine dioxide by reacting in a reaction vessel an alkali metal chlorate, a mineral acid and methanol as a reducing agent in proportions to generate chloride dioxide in a reaction medium maintained at a temperature from about 50° C. to about 100° C. and an acidity within the interval from about 2 to 4.8N and subjected to a subatmospheric pressure sufficient to effect evaporation of water whereby a mixture of chlorine dioxide and water vapor is withdrawn from an evaporation region in the reaction vessel and an alkali metal salt of the mineral acid is precipitated in a crystallization region in the reaction vessel, wherein the reaction is performed in the presence of a catalyst comprising antimony, molybdenum, technetium, ruthenium, rhodium, rhenium, osmium, iridium or a combination of one or more of these with manganese or vanadium, said catalyst being added in the form of a solution of soluble salts.

5. A process according to claim 4, wherein the catalyst is added in such an amount that the concentration in the reaction medium is 0.001 to 10 mM.

6. A process according to claim 4, wherein the soluble salt or salts are selected from the group consisting of chlorides, sulfates and combinations thereof.

7. A process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and an acidity within the interval from about 2 to 4.8N and subjected to a subatmospheric pressure sufficient to effect evaporation of water whereby a mixture of chlorine dioxide and water vapor is withdrawn from an evaporation region in the reaction vessel and an alkali metal salt of the mineral acid is precipitated in a crystallization region in the reaction vessel, wherein the reaction is performed in the presence of a catalyst consisting of one or more metals selected from the group consisting of antimony, molybdenum, technetium, ruthenium, rhodium, palladium, rhenium, osmium, iridium, platina, and combinations of one or more of the above with manganese or vanadium, said catalyst being added in the form of a solution of soluble salts.

8. A process according to claim 7, wherein the catalyst is added in such an amount that the concentration in the reaction medium is 0.001 to 10 mM.

9. A process according to claim 7, wherein the soluble salt or salts are selected from the group consisting of chlorides, sulfates and combinations thereof.

* * * * *

REEXAMINATION CERTIFICATE (1927th)
United States Patent [19]
Norell

[11] B1 5,002,746
[45] Certificate Issued  * Feb. 16, 1993

[54] PROCESS FOR THE PRODUCTION OF CHLORINE DIOXIDE

[75] Inventor: Maria Norell, Sundsvall, Sweden

[73] Assignee: Eka Nobel AB, Surte, Sweden

Reexamination Request:
No. 90/002,525, Nov. 29, 1991

Reexamination Certificate for:
Patent No.: 5,002,746
Issued: Mar. 26, 1991
Appl. No.: 372,469
Filed: Jun. 28, 1989

[ * ] Notice: The portion of the term of this patent subsequent to Sep. 13, 2005 has been disclaimed.

[30] Foreign Application Priority Data

Oct. 20, 1988 [SE] Sweden ............... 8803761

[51] Int. Cl.$^5$ .......................... C01B 11/02
[52] U.S. Cl. ..................................... 423/479
[58] Field of Search ................... 423/478, 479

[56] References Cited

U.S. PATENT DOCUMENTS

| | | | |
|---|---|---|---|
| 3,563,702 | 2/1971 | Partridge et al. | 423/478 |
| 3,933,988 | 1/1976 | Rosen | 423/480 |
| 4,051,229 | 9/1977 | Isa et al. | 423/478 |
| 4,081,520 | 3/1978 | Swindells et al. | 423/478 |
| 4,145,401 | 3/1979 | Swindells et al. | 423/478 |
| 4,154,809 | 5/1979 | Swindells et al. | 423/479 |
| 4,154,810 | 5/1979 | Isa et al. | 423/478 |
| 4,169,134 | 9/1979 | Isa et al. | 423/478 |
| 4,178,356 | 12/1979 | Shibuya et al. | 423/478 |
| 4,206,193 | 6/1980 | Partridge et al. | 423/478 |
| 4,381,290 | 4/1983 | Hardee et al. | 423/478 |
| 4,421,730 | 12/1983 | Isa et al. | 423/478 |
| 4,465,658 | 8/1984 | Fredette | 423/478 |
| 4,473,540 | 9/1984 | Fredette | 423/479 |
| 4,770,868 | 9/1988 | Norell | 423/479 |
| 4,864,456 | 2/1975 | Winfield et al. | 423/478 |
| 4,978,517 | 12/1990 | Norell et al. | 423/479 |

FOREIGN PATENT DOCUMENTS

| | | |
|---|---|---|
| 906732 | 8/1972 | Canada . |
| 969735 | 6/1975 | Canada . |
| 0065819 | 12/1982 | European Pat. Off. . |
| 0131378 | 1/1985 | European Pat. Off. . |
| 0284577 | 9/1988 | European Pat. Off. . |
| 2426016 | 12/1979 | France . |
| 2464224 | 3/1981 | France . |
| 328854 | 9/1970 | Sweden . |

*Primary Examiner*—Jeffrey Edwin Russel

[57] ABSTRACT

The present invention relates to a process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and an acidity within the interval from about 2 to 4.8 N and subjected to a subatmospheric pressure sufficient to effect evaporation if water. A mixture of chlorine dioxide and water vapor is withdrawn from an evaporation region in the reaction vessel and an alkali metal salt of the mineral acid is precipitated in a crystallization region in the reaction vessel. The reaction is performed in the presence of a catalyst, which comprises a metal or a combination of two or more metals being selected from the group consisting of antimony, molybdenum, technetium, ruthenium, rhodium, palladium, rhenium, osmium, iridium, platina, or a combination of one or more of these with manganese or vanadium.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *